3,124,616
METHOD FOR THE ALKYLATION OF DECABORANE

Ralph R. Schroeder, Harmony, and Paul R. Wunz, Jr., Gibsonia, Pa., assignors to Callery Chemical Company, Pittsburgh, Pa., a corporation of Pennsylvania
No Drawing. Filed Feb. 9, 1956, Ser. No. 564,366
6 Claims. (Cl. 260—606.5)

This invention relates to an improved method for the alkylation of decaborane and more particularly, it relates to a new and improved method of producing liquid alkyl decaboranes such as the ethyl decaboranes, by carrying out the alkylation of decaborane in the presence of a mixed catalyst composed of aluminum chloride and silica gel.

Decaborane was first prepared by Stock in 1913 but aroused very little interest until it was discovered that it possessed a high heat of combustion. However, the fact that decaborane was a solid limited its use as a high energy fuel in rocket and jet-type engines. More recently, it has been found that the alkyldecaboranes, and the lower alkyl derivatives in particular, are liquids possessing heats of combustion of more than 24,000 B.t.u./lb. compared to about 18,000 B.t.u./lb. for the best known hydrocarbon fuels. This stimulated renewal interest in methods of preparing the alkyl decaboranes for use as high energy fuels. Since there are no reports in the literature on how to alkylate decaborane, it appeared highly desirable to develop methods for preparing liquid alkyl decaboranes in good yields.

It is one object of this invention to provide a new and improved method for alkylating decaborane.

Another object is to provide an improved method for producing liquid alkyl decaboranes by the reaction of an alkyl halide with decaborane in the presence of a Friedel-Crafts type catalyst composed of aluminum chloride and silica gel.

Other objects will appear from time to time throughout the following specification and appended claims.

This new and improved method for alkylating decaborane to produce liquid alkyl decaboranes will be more fully described hereinafter and the novelty thereof will be particularly pointed out and distinctly claimed.

The present invention is based upon the discovery that decaborane can be alkylated in the presence of aluminum chloride to convert 40% of the boron charged as decaborane to liquid alkyl decaboranes. However, the use of an aluminum chloride-silica gel catalyst under the same conditions will convert 80–90% of the boron charged to liquid alkyl decaboranes. The general equation for this reaction can be expressed as follows:

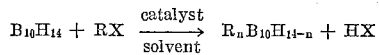

$$B_{10}H_{14} + RX \xrightarrow[\text{solvent}]{\text{catalyst}} R_nB_{10}H_{14-n} + HX$$

where R is an alkyl radical, X is a halide and $n$ is an integer from 1 to 4. The solvent should preferably be one which will dissolve an appreciable amount of decaborane as for example carbon disulfide, 2,3-dimethyl butane, n-hexane or pentane. The liquid alkyl decaboranes formed are mixtures of the mono-, di-, tri- and tetraalkyl derivatives which can be separated by fractional distillation if desired. However, the liquid mixture of alkyldecaboranes obtained has an average boron content of about 60 milligram atoms per gram (conventionally abbrebiated mats./g.) and is useful as a high energy fuel in conventional rocket and jet engines without further purification.

The procedure used to alkylate decaborane was as follows: decaborane and a substantial molar excess of an alkyl halide were mixed with a catalytic amount of aluminum chloride and silica gel. About 100 ml. of a solvent such as 2,3-dimethyl butane was added for every .05 mols of decaborane used. The mixture was placed in a round-bottomed flask equipped with a water condenser and refluxed for about 3 hours with magnetic stirring. The liquid reaction mixture was decanted from the silica gel and poured into water to decompose any $AlCl_3$ remaining. The solvent layer was separated and dried and the solvent removed. The mixture of liquid alkyl decaboranes remaining was analyzed for boron and carbon after removal of the unreacted decaborane by sublimation.

In one series of experiments, ethyl bromide was used as the alkylating agent for decaborane which was dissolved in 100 ml. of 2,3-dimethyl butane. A mixture of aluminum chloride and silica gel was used as a catalyst in three of the runs while $AlCl_3$ alone was used as the catalyst in one of the runs for comparison. The reaction mixture was refluxed at 58° C. for 3 to 4 hours and the liquid ethyl decaboranes obtained were analyzed for boron and carbon with the following results.

| Run No. | Mols $B_{10}H_{14}$ | Mols EtBr | Mols $AlCl_3$ | g. $SiO_2$ | Percent $B_{10}H_{14}$ Recovered | Percent B Charged Recovered as Liquid Product | Prod. Anal., mat./g. | |
|---|---|---|---|---|---|---|---|---|
| | | | | | | | B | C |
| 1 | .05 | .64 | .008 | 1 | 35.0 | 60.8 | 62.2 | 16.3 |
| 2 | .05 | .10 | .008 | 1 | 0.0 | 88.7 | 59.1 | 21.7 |
| 3 | .05 | .10 | .008 | 1 | 0.0 | 97.0 | 59.8 | 21.4 |
| 4 | .05 | .11 | .008 | | 54.0 | 40.7 | 31.7 | 46.5 |

It is obvious from the above data that the use of silica gel in conjunction with aluminum chloride is much more effective as a catalyst for alkylating decaborane than is $AlCl_3$ alone. The aluminum chloride-silica gel catalyst results in the formation of more liquid ethyl decaboranes with a much higher boron content than when the reaction is carried out in the presence of $AlCl_3$ only.

In other experiments, it was found that other solvents for decaborane such as carbon disulfide, hexane, benzene and pentane could be used in place of 2,3-dimethyl butane with equal effectiveness in the reaction disclosed. With all these solvents under the same reaction conditions, the aluminum chloride-silica gel catalyst gave much better yields of liquid ethyl decaboranes than did $AlCl_3$. It was also found that any lower alkyl halide such as methyl iodide or ethyl chloride could be used as the alkylating reagent. However, higher alkyl halides regardless of the length of the alkyl chain may be used if desired.

In another experiment, 3 g. (.025 mols) of decaborane and .056 mols of methyl iodide were dissolved in 50 ml. of carbon disulfide to which was added .0038 mols of $AlCl_3$ and 0.5 g. of silica gel. The mixture was refluxed for three hours and the liquid methyl decaboranes dissolved in the carbon disulfide were decanted from the catalyst residue. After washing the carbon disulfide solution with water, it was dried and the solvent removed leaving a liquid non-volatile mixture of methyl decaboranes weighing 2.4 g. which analyzed 60.9 mats./g. of boron and 20.6 mats./g. of carbon. No attempt was made to separate the mixture of methyl decaboranes obtained. The conversion of decaborane to liquid methyl decaboranes in this experiment was approximately 60%.

The liquid alkyl decaboranes produced by the process disclosed are useful as high energy fuels in bipropellant systems. These liquids may be separated into their pure components or used directly as mixtures. In either case, they burn readily with conventional oxidizers such as air or oxygen and are primarily useful in turbojet, ram jet and rocket engines. They may be used alone or they may be mixed with hydrocarbon fuels. The liquid alkyl decaboranes have high heats of combustion on the order of 20–

50% greater than the best known hydrocarbon fuels. They are also spontaneously inflammable in air at temperatures in excess of 250° C., have a wide liquidus range, low viscosity, good heat stability and are moderately resistant to hydrolysis.

In actual tests, the fuels produced by the process of the present invention were introduced into the combustion chamber of a jet test engine, burned with compressed air and the efficiency of combustion and the output of the engine were measured. It was found that the combustion efficiency of the fuel was equal to JP-4 (a standard jet fuel) and that the thrust of the engine per unit weight of fuel was far greater than that obtained by using the best hydrocarbon fuels. Since the engine output is directly proportional to the heat of combustion per unit weight of fuel, it is obvious that an aircraft using a fuel composed of alkyl decaboranes can travel proportionately further with the same load or carry proportionately greater loads than when using a conventional fuel.

Having thus described this invention with the particularity and distinctness required by the patent statutes, it should be understood that other variations are possible, and that within the scope of the appended claims this invention may be practiced otherwise than as specifically described.

What we claim is:

1. A method of preparing a high energy fuel consisting essentially of liquid lower alkyl decaboranes which comprises contacting a lower alkyl halide with decaborane in a stable solvent therefor in the presence of a catalytic amount of aluminum chloride and silica gel and recovering a high energy fuel consisting essentially of liquid lower alkyl decaboranes.

2. A method according to claim 1 in which the solvent is selected from the class consisting of benzene, pentane, hexane, carbon disulfide and 2,3-dimethyl butane.

3. A method according to claim 1 in which the lower alkyl halide used is ethyl bromide and the liquid product recovered is a mixture of ethyl decaboranes.

4. A method according to claim 1 in which the lower alkyl halide used is methyl iodide and the liquid product recovered is a mixture of methyl decaboranes.

5. A method of preparing a high energy fuel consisting essentially of a mixture of liquid ethyl decaboranes which comprises contacting ethyl bromide and decaborane in a molar ratio of 2:1 in 2,3-dimethyl butane in the presence of aluminum chloride and silica gel, refluxing the mixture for about three hours, pouring the reaction mixture into water to decompose the $AlCl_3$, separating the solvent layer, removing the solvent and unreacted decaborane and recovering the liquid mixture of ethyl decaboranes thus formed.

6. A method of preparing a high energy fuel consisting essentially of a mixture of liquid methyl decaboranes which comprises contacting methyl iodide and decaborane in a molar ratio of 2:1 in carbon disulfide in the presence of aluminum chloride and silica gel, refluxing the mixture for about three hours, decanting the solvent layer from the catalyst residue, washing the solvent layer with water to decompose the $AlCl_3$, removing the solvent and unreacted decaborane and recovering the liquid mixture of methyl decaboranes thus formed.

No references cited.